United States Patent [19]

Kawashima et al.

[11] Patent Number: 5,291,085
[45] Date of Patent: Mar. 1, 1994

[54] SPLIT-PHASE STARTER FOR AN ELECTRIC MOTOR

[75] Inventors: Uehito Kawashima, Tochiga; Masahide Kobayashi, Saitama; Hiroshi Kaise; Yutaka Hirano, both of Gunma, all of Japan

[73] Assignee: Sanyo Electric Co., Ltd., Osaka, Japan

[21] Appl. No.: 980,749

[22] Filed: Nov. 24, 1992

[30] Foreign Application Priority Data

Nov. 26, 1991 [JP] Japan .................. 3-310959

[51] Int. Cl.$^5$ .................. H02K 11/00; H02K 7/08
[52] U.S. Cl. .................. 310/68 C; 361/24; 361/27; 318/791
[58] Field of Search ........... 310/68 R, 68 C; 361/24, 361/27, 106; 318/783, 785, 791, 790; 335/126, 131, 202

[56] References Cited

U.S. PATENT DOCUMENTS

| 4,164,000 | 8/1979 | Woods | 361/27 |
| 4,237,508 | 12/1980 | Woods et al. | 361/24 |
| 4,313,076 | 1/1982 | Ratje | 318/785 |
| 4,327,481 | 5/1982 | Woods | 361/24 |
| 4,422,120 | 12/1983 | Kobayashi et al. | 361/24 |
| 4,654,617 | 3/1987 | Grenier et al. | 335/262 |
| 5,053,908 | 10/1991 | Cooper et al. | 361/24 |
| 5,055,726 | 10/1991 | D'Entremont et al. | 310/68 C |

FOREIGN PATENT DOCUMENTS 58-34722 8/1983 Japan .
61-11985 4/1986 Japan .

Primary Examiner—Steven L. Stephan
Assistant Examiner—C. LaBelle
Attorney, Agent, or Firm—Finnegan, Henderson, Farabow, Garrett & Dunner

[57] ABSTRACT

A split-phase starter for an electric motor having a casing made up of a casing body and a lid secured to the casing body, the casing body having a first casing and a second casing, a relay contact mechanism being arranged in the casing body, and a positive temperature coefficient thermistor being arranged in the second casing.

7 Claims, 4 Drawing Sheets

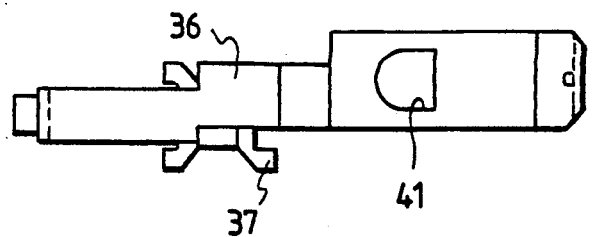
FIG. 8
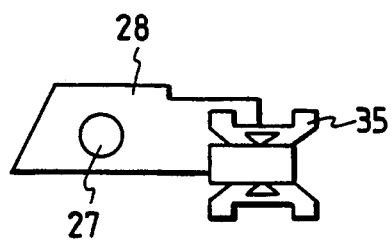
FIG. 9
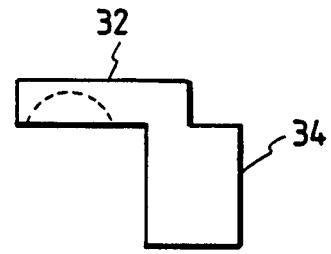
FIG. 10
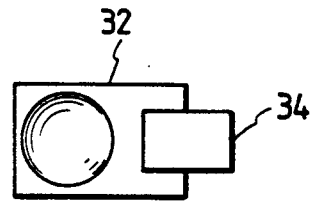
FIG. 11
FIG. 12
PRIOR ART
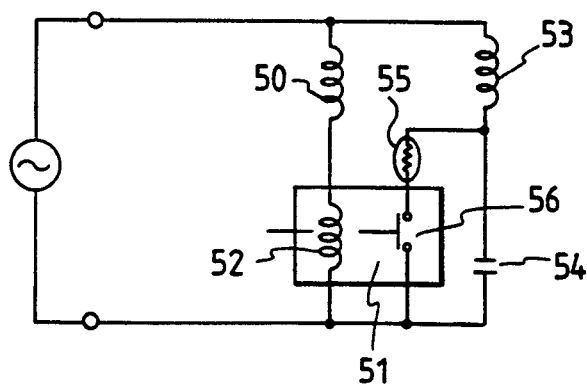

SPLIT-PHASE STARTER FOR AN ELECTRIC MOTOR

BACKGROUND OF THE INVENTION

1. Field of the Invention

This invention relates to a split-phase starter for an electric motor.

2. Description of the Related Art

A conventional split-phase starter for an electric motor is constructed as disclosed, for instance, by Examined Japanese Utility Model Publication No. Sho-61-11985/(1986). The conventional split-phase starter is shown in FIG. 12. The main winding 50 of the electric motor is connected in series to coil 52 of a starting relay 51, and auxiliary winding 53 of the electric motor is connected in series with a capacitor 54. The capacitor 54 is shunted by a series circuit with a positive characteristic thermistor 55, having a positive temperature coefficient, and a normally open relay contact 56 of the starting relay 51.

In the case of the starter thus constructed, after the motor is started, the normally open relay contact 56 of the starting relay 51 is released to prevent the flow of current in the thermistor 55 thereby to minimize a loss of power attributing to the thermistor 55 during operation.

In the conventional split-phase starter shown in FIG. 12, the connection of the starting relay 51 and the positive temperature coefficient thermistor 55 is shown; however, the structure of the starting relay 51 and the thermistor 55 is not revealed. Nevertheless, in the conventional split-phase starter, the thermistor is held by a spring contact which is in contact with the inner wall of a casing, and therefore it is rather difficult to insert the thermistor in the casing, and the thermistor may be scratched while inserting. (Referring with Examined Japanese Utility Model Publication No. Sho-58-34722/(1983)).

SUMMARY OF THE INVENTION

The present invention has been made in view of the above circumstances and has as an object to provide a split-phase starter for an electric motor in which the positive temperature coefficient thermistor can be readily mounted in the casing, and in the case where the positive temperature coefficient thermistor is mounted together with the starting relay, the positive temperature coefficient thermistor is prevented from being deteriorated by sparks produced by the relay contacts, and further, the relay coil of the starting relay can be wound in the final manufacturing step.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims. To achieve the objects and in accordance with the purpose of the invention, as embodied and broadly described herein, the split-phase starter for an electric motor of this invention comprises a starting relay including a relay coil connected in series with the main winding, and a relay contact means connected in series with the auxiliary winding, a positive temperature coefficient thermistor connected in series with the relay contact means, a casing that accommodates the positive temperature coefficient thermistor being integral with a casing body that the relay coil and the relay contact means of the starting relay are arranged.

According to a second aspect of the invention, there is provided a split-phase starter for an electric motor comprising positive temperature coefficient thermistor elastically supported by a terminal board having a spring contact in a space which is defined by a casing body and a lid in which the terminal board has one end portion locked to the casing body, and the other end portion held between the casing body and the lid.

According to a third aspect of the invention, there is provided a split-phase starter for an electric motor comprising the starting relay and the positive temperature coefficient thermistor being accommodated in a casing which is divided into at least two parts in such a manner that the relay and the thermistor are separated from each other, in which the positive temperature coefficient thermistor is held between a spring contact connected with one contact of the relay contact means and a spring contact to a terminal board which is connected outside the casing, the casing comprising a casing body on which the relay coil is wound and which accommodates the relay contact means which is operated by a plunger, and a lid which accommodates the positive temperature coefficient thermistor, the positive temperature coefficient thermistor and the relay contact means being separated from each other by contact mounting plates of the relay contact means and a contact cover which electrically insulates the contact mounting plates.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention. In the drawings.

FIG. 8 is a plan view showing a terminal board used in the invention;

FIG. 9 is a plan view showing a spring contact on a stationary contact plate of the relay contact mechanism of FIG. 6;

FIG. 10 is a front view of a contact cover of the relay contact mechanism of FIG. 6;

FIG. 11 is a bottom view of the contact cover of FIG. 10; and

FIG. 12 is a circuit diagram showing the starting circuit of a conventional single-phase induction motor.

DETAILED DESCRIPTION OF THE PREFERRED EMBODIMENTS

Figure 1:
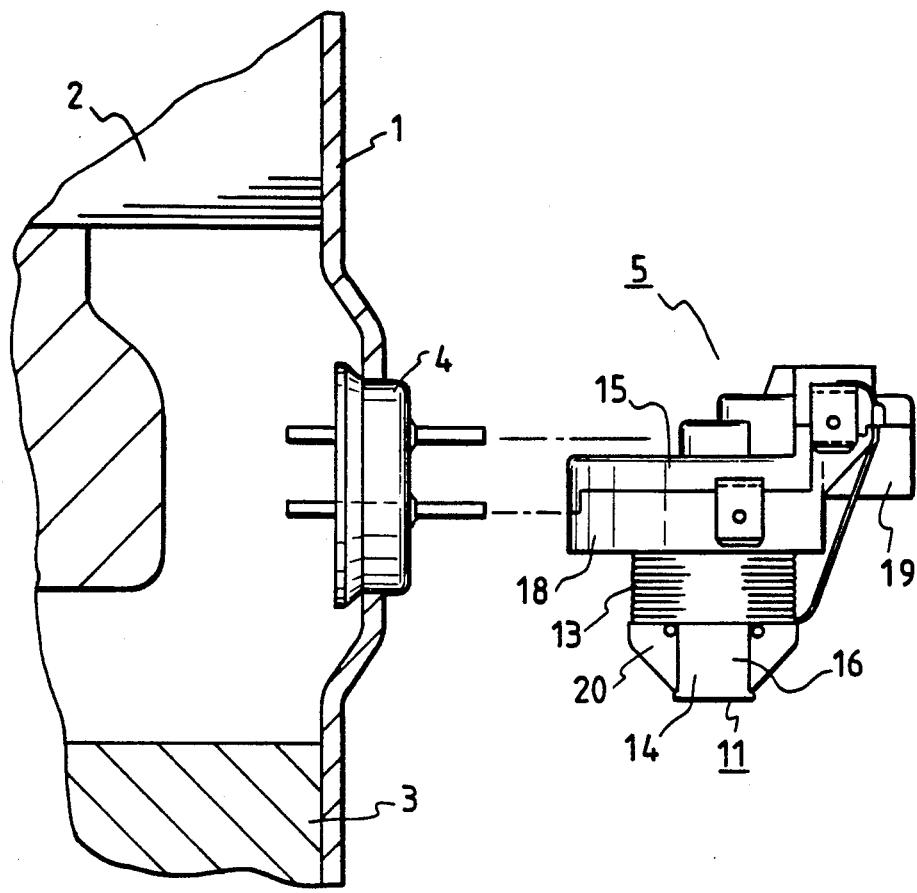
FIG. 1 is a sectional view, with parts cut away, of a hermetically sealed type compressor, and a side view of a split-phase starter which is to be coupled to the compressor, which constitutes one embodiment of this invention.
Figure 2:
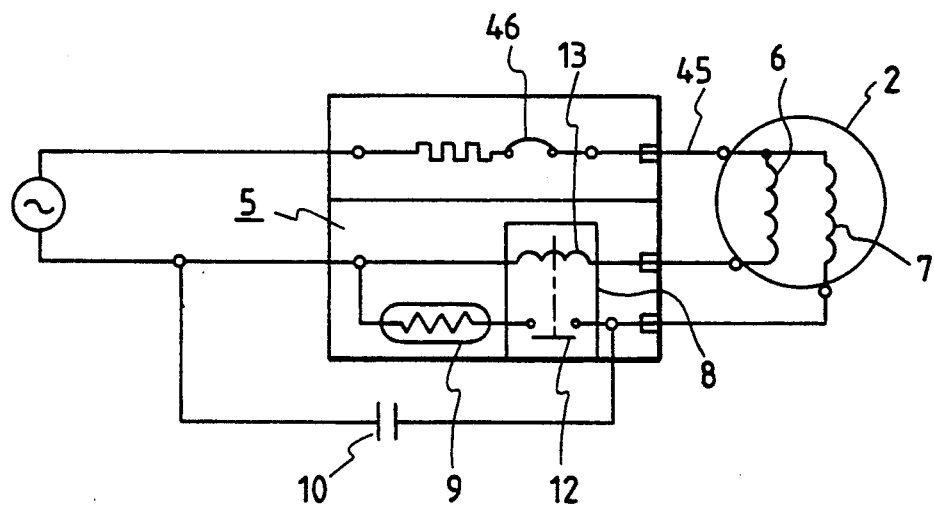
FIG. 2 is a circuit diagram of the split-phase starter of a single-phase induction motor in the invention.

In FIG. 1, reference numeral 1 designates a hermetically sealed type container in which a single-phase induction motor 2 and a compression element 3 are accommodated; an airtight terminal block 4 is fitted in an opening formed in the closed container 1 in such a manner that it communicates with the exterior of the container 1. A starter 5 for starting the single-phase induction motor 2 is coupled with the terminal block 4. Referring to FIG. 2, the induction motor 2 has a main winding 6 and an auxiliary winding 7, which have a common node connection.

In FIG. 2, the starter 5 comprises a starting relay 8, a positive temperature coefficient thermistor 9, and a capacitor 10. The thermistor 9 is integral with the starting relay 8. The starting relay 8 has a casing 11 (FIG. 3) of insulating material, a relay contact mechanism 12, and a starting relay coil 13.

Referring again to FIG. 1, the casing 11 is made up of a casing body 14, and a lid 15 covering the casing body 14. The casing body 14 has a first casing 16 in the form of a cylinder, a flange 18 having a recess 17 (FIG. 4) at one end of the first casing 16, a second casing 19 being integral with the flange 18, and a protrusion 20 extended at the other end of the casing 11.

Figure 4:
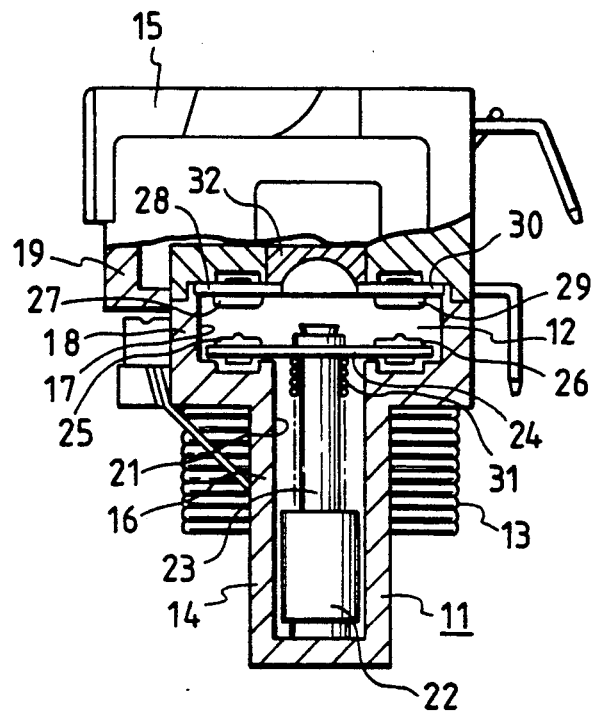
FIG. 4 is a side view of the starter of FIG. 1, with parts cut away, showing a relay contact mechanism in the starter of the invention.
Figure 5:
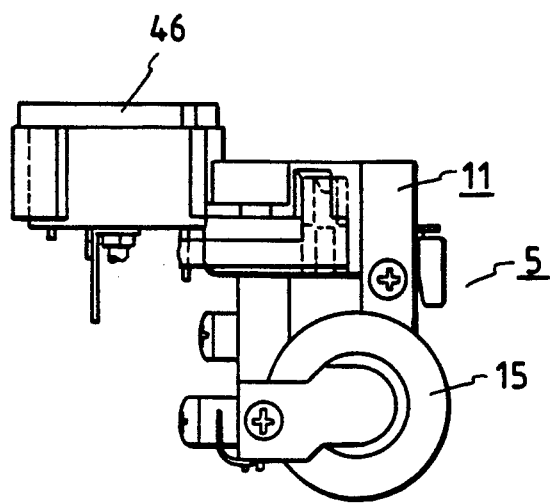
FIG. 5 is a plan view of the starter of FIG. 1 with an overload relay.
Figure 6:
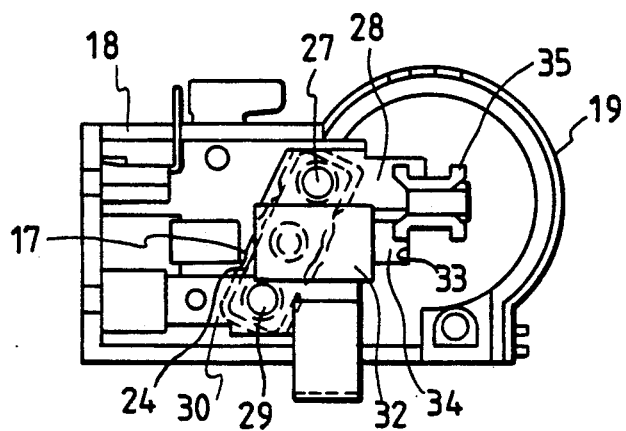
FIG. 6 is a plan view of the starter of FIG. 1 showing the relay contact mechanism in a casing body.
Figure 7:
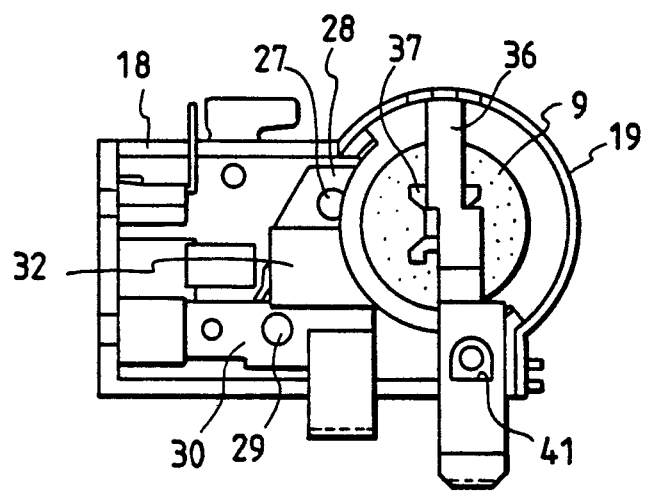
FIG. 7 is a plan view of the starter of FIG. 1 showing the relay contact mechanism and the positive temperature coefficient thermistor in a casing body.

As shown in FIG. 4, the relay contact mechanism 12 has a plunger 22 which can slide in a hole 21 defined by the first casing 16, a movable shaft 23 inserted in the plunger 22 along the central axis, a movable contact plate 24 connected to the shaft 23 and arranged in the recess 17 of the flange 18, a first movable contact 25 provided on one end of the movable contact plate 24 and a second movable contact 26 provided on the other end of movable contact plate 24, a first stationary contact plate 28 with a first stationary contact 27 that can be contacted by the first movable contact 25; a second stationary contact plate 30 with a stationary contact 29 that can be contacted by the second movable contact 26; and a coil spring 31 wound on the movable shaft 23 such that it is located between the plunger 22 and the movable contact plate 24. The first stationary contact plate 28 and the second stationary contact plate 30 are mounted on the end face of the flange 18. The recess 17 of the flange 18 is covered by the stationary contact plates 28 and 30, and a contact cover 32 provided between the stationary contact plates 28 and 30. As shown in FIG. 6, the contact cover 32 is mounted with its protrusion 34 fitted in a recess 33 formed in the second casing 19 (also see FIG. 10). The contact cover 32 is made of electrically insulating material.

Figure 3:
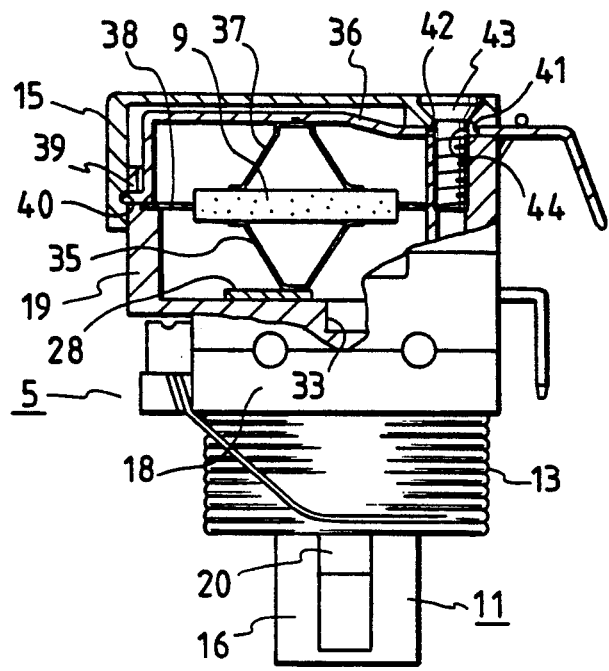
FIG. 3 is a side view of the starter of FIG. 1, with parts cut away, of a positive temperature coefficient thermistor used in the starter according to the invention.

As shown in FIG. 3, the relay coil 13 is wound on the first casing 16 in such a manner that it is located between the flange 18 and the protrusion 20.

Also, the positive temperature coefficient thermistor 9 is arranged in the second casing 19. The thermistor 9 is held between a first spring contact 35 and a second spring contact 37. The first spring contact 35 is mounted on the first stationary contact plate 28 so that the first spring contact 35 extends upwardly. The second spring contact 37 is secured to a terminal board 36 so that the second spring contact 37 extends downwardly. That is, the thermistor 9 is clamped by the spring contacts 35 and 37 (also see FIGS. 8 and 9). A mica plate 38 is fitted in the second casing 19 to prevent the lateral movement of the thermistor 9.

The terminal board 36 has a first end portion and a second end portion. The first end portion is locked to a locking hole 39 formed in the second casing 19, and the second end portion is held between the second casing 19 and the lid 15 with the second end portion extending outside the casing 11. The lid 15 has a recess 40 in which the first end portion of the terminal board 36 is fitted. In addition, the lid 15 includes a protrusion 42 which fits in a hole 41 formed in the terminal board 36. The protrusion 42 has a hole 44 at the center that is engaged with a screw 43 used to secure the lid 15 to the casing body 14.

The first terminal of the main winding 6 and the first terminal of the auxiliary winding 7 are connected with a common line 45, which is connected in series with an overload relay 46 (FIG. 2). The second terminal of the main winding 6 is connected in series with the starting relay coil 13, and the second terminal of the auxiliary winding 7 is connected in series with the series circuit of the thermistor 9 and the relay contact mechanism 12. A capacitor 10 is connected in parallel with the series circuit of the thermistor 9 and the relay contact mechanism 12. The overload relay 46 is mounted on the starter 5, which is coupled to the airtight terminal block 4.

The steps of assembling the starter 5 thus constructed will be described in order.

First, movable components such as the plunger 22, the shaft 23, and the movable contact plate 24 are inserted in the hole 21 defined by the first casing 16 and the recess 17 of the flange 18, and the stationary contact plates 28 and 30 are arranged on the end face of the flange 18. Thus, the relay contact mechanism 12 has been set.

Thereafter, the following components are arranged inside the second casing 19. The spring contact 35 is mounted on the first stationary contact plate 28 so that it is directed upwardly. The positive temperature coefficient thermistor 9 is placed on the first spring contact 35. And, the terminal board 36, with the second spring contact 37, is secured to the second casing 19. Thereafter, the lid 15 is secured to the casing body 14 with the screw 43. Thus, the positive temperature coefficient thermistor 9 is set.

In the final step, the relay coil 13 is wound on the first casing 16 so that it is located between the flange 18 and the protrusion 20.

Thus, the starter 5 has been assembled.

Now, the operation of the circuit will be described.

When energized, the single-phase induction motor is started with the aid of a circuit consisting the relay coil 13 of the starting relay 8, the thermistor 9, and the relay contact mechanism 12 of the starting relay 8. When the single-phase induction motor 2 has been started, the relay contact mechanism 12 is opened by the current flowing in the main winding 6. With the aid of the capacitor 10, the single-phase induction motor 12 is operated with high efficiency.

Now, some of the advantages of the invention, inter alia, will be described.

The spring contacts 35 and 37, which clamp the positive temperature coefficient thermistor 9, are mounted one after the other so that thermistor 9 can be easily mounted in the second casing 19. Furthermore, the spring contacts 35 and 37 protect the thermistor 9 from being scratched when set in the second casing 19.

The terminal board 36 is mounted with its first end portion locked to the locking hole 39 of the second casing 19 and the second end portion held between the second casing 19 and the lid 15. That is, the terminal board 36 is mounted in such a manner that a gap is formed between itself and the lid 15. Therefore, the force of clamping the positive temperature coefficient thermistor does not act on the central portion of the lid 15.

Furthermore, the lid 15 is mounted with the protrusion 42 of the lid 15 engaged with the hole 41 of the terminal board 36, and the lid 15 is secured to the casing body 14 with the screw 43 inserted into the hole 44 formed in the protrusion 42. This structure reduces the number of screws used to secure lid 15 and terminal board 36.

In the casing 11, the positive temperature coefficient thermistor 9 and the relay contact mechanism 12 are separated from each other by the stationary contact plates 28 and 30 and the contact cover 32. Hence, even if sparks are produced when the contacts 25 and 26 on the movable contact plate 24 are brought into or out of engagement with the stationary contacts 27 and 29 of the stationary contact plates 28 and 30, the sparks will not directly fly to the positive temperature coefficient thermistor 9. Thus, the sparks will not deteriorate the thermistor 9.

The relay coil 13 is wound on the first casing 16 in the final assembling step. This method eliminates the problem of the coil being scratched or damaged while the starter is being assembled.

Moreover, as is apparent from the above description, the starter 5 can be assembled by supplying components, such as the relay contact mechanism 12, the thermistor 9, and the lid 15, one after the other. This will allow automation of the manufacture of the starter.

In the split-phase starter of the invention, the second casing, which accommodates the positive temperature coefficient thermistor, is integral with the first casing body, which the starting relay coil is wound around, such that the positive temperature coefficient thermistor is shifted in position from the starting relay coil. Therefore, after the positive temperature coefficient thermistor is mounted, the starting relay coil can be wound on the first casing.

Furthermore, in the split-phase starter of the invention, the positive temperature coefficient thermistor is supported by the spring contacts in a space which is defined by the casing body and the lid. Therefore, the positive temperature coefficient thermistor can be mounted without damage, and the difficulty experienced while inserting the thermistor due to the force exerted by the spring contacts clamping the thermistor to the casing is limited.

In addition, in the split-phase starter of the invention, the starting relay and the positive temperature coefficient thermistor are separated from each other by the stationary contact plates of the relay contact means and the contact cover provided between the stationary contact plates. Therefore, the split-phase starter is free from the difficulty of the positive temperature coefficient thermistor being deteriorated by sparks from the relay contact means.

As was described above, in the split-phase starter for an electric motor comprising the starting relay including the starting relay coil connected in series with the main winding, and the relay contact means connected in series with the auxiliary winding; the positive temperature coefficient thermistor connected in series with the relay contact means; and the capacitor connected in parallel with the series circuit of the relay contact means and the positive temperature coefficient thermistor, the casing accommodating the positive temperature coefficient thermistor is integral with the casing body in which the starting relay coil and the relay contact means of the starting relay are arranged. Hence, the second casing accommodating the positive temperature coefficient thermistor is shifted in position from the starting relay coil wound on the first casing, and the starting relay coil can be wound in the final manufacturing step of the starter. Therefore, the starter of the invention is free from the difficulty that the starting relay coil is scratched or damaged during assembling work.

Furthermore, in the split-phase starter for an electric motor comprising the positive temperature coefficient thermistor which is elastically supported by the terminal board in the space which is defined by the casing body and the lid, the terminal board supporting the positive temperature coefficient thermistor in the space has one end portion locked to the casing body, and the other end portion held between the casing body and the lid. Hence, the casing is free from the force caused by the spring contacts while clamping the positive temperature coefficient thermistor. Also, the lid can be secured to the casing body with a small number of fasteners.

In addition, in the split-phase starter for an electric motor comprising the starting relay and the positive temperature coefficient thermistor being accommodated in a casing which is divided into at least two chambers in such a manner that the relay and the thermistor are separated from each other, the positive temperature coefficient thermistor is held between the spring contact connected to one contact of the relay contact means and the spring contact mounted on the terminal board which is connected outside the casing, and the casing having the casing body on which the starting relay coil is wound and which accommodates the relay contact means which is operated by the plunger; and the lid which accommodates the positive temperature coefficient thermistor, the positive temperature coefficient thermistor and the relay contact means being separated from each other by the stationary contact plates of the relay contact means and the contact cover which electrically insulates the stationary contact plates. Hence, although the relay contact means and the positive temperature coefficient thermistor are accommodated in one casing, the sparks produced when the relay contact means is operated (opened and closed) will not directly fly over to the positive temperature coefficient thermistor; that is, the latter is protected from deterioration.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A split-phase starter for an electric motor having a main winding and an auxiliary winding, the split-phase starter comprising:
   a starting relay including a relay coil and an associated relay contact means, the relay coil electrically connected with the main winding, and the relay contact means electrically connected with the auxiliary winding;
   a positive temperature coefficient thermistor connected in series with the relay contact means to form a series circuit;
   a casing body including a first casing and a second casing, the relay contact means being positioned in the casing body, and the positive temperature coefficient thermistor being positioned in the second casing;
   a lid secured to the casing body;
   the lid having a recess and a protrusion, the protrusion having a hole located in the center of the protrusion;
   a terminal board having a first end portion and a second end portion having a hole, the first end portion being secured to the second casing and fitted into the recess in the lid, the second end portion being secured between the second casing and the lid, the protrusion of the lid extending through the hole in the second portion of the terminal board; and
   a screw engaging the hole in the protrusion of the lid to secure the lid to the casing body.

2. A split-phase starter according to claim 1, wherein the relay coil is wound around the first casing.

3. A split-phase starter according to claim 1, further comprising:
   a first spring contact secured to the terminal board;
   a second spring contact secured to the relay contact means;
   the positive temperature coefficient thermistor being clamped between the first spring contact and the second spring contact; and
   a mica plate being fitted in the second casing to prevent the lateral movement of the positive temperature coefficient thermistor.

4. A split-phase starter for an electric motor having a main winding and an auxiliary winding, the split-phase starter comprising:
   a starting relay including a relay coil and an associated relay contact means, the relay coil electrically connected with the main winding, and the relay contact means electrically connected with the auxiliary winding;
   a positive temperature coefficient thermistor connected in series with the relay contact means to form a series circuit;
   a casing body including a first casing and a second casing, the relay contact means being positioned in the casing body, and the positive temperature coefficient thermistor being positioned in the second casing;
   a lid secured to the casing body;
   the first casing is in the form of a cylinder having a hole defined by the walls of the cylinder;
   the casing body further including,
      a flange located at one end of the first casing, the flange having a recess and an end face; and
      a protrusion extending at the end of the casing body opposite the one end; and
   the second casing being integral with the flange.

5. A split-phase starter according to claim 4, wherein:
   the relay contact mechanism includes,
      a plunger movable in the hole of the first casing;
      a shaft secured to the plunger along a central axis;
      a movable contact plate connected to the shaft and positioned in the recess of the flange;
      a coil spring wound on the shaft and located between the plunger and the movable contact plate;
      a first movable contact secured to one end of the movable contact plate;
      a second movable contact secured to an end of the movable contact plate opposite the one end;
      a first stationary contact plate mounted on the end face of the flange;
      a first stationary contact secured to the first stationary contact plate;
      a second stationary contact plate mounted on the end face of the flange;
      a second stationary contact secured to the first stationary contact plate; and
      the first stationary contact plate and second stationary contact plate covering the recess of the flange;
   the second casing having a recess; and
   a contact cover having a protrusion, the contact cover being located between the first stationary contact plate and the second stationary contact plate to cover the recess of the flange, the contact cover protrusion being fitted in the recess of the second casing.

6. A split-phase starter according to claim 5, wherein the contact cover is an electrical insulator.

7. A split-phase starter according to claim 4, wherein the relay coil is wound around the first casing.

* * * * *